United States Patent
Bogun

(10) Patent No.: US 11,426,753 B2
(45) Date of Patent: Aug. 30, 2022

(54) METHOD AND DEVICE FOR APPLYING COATING LAYERS TO A COATING MATERIAL

(71) Applicant: Tipper Tie Technopack GmbH, Glinde (DE)

(72) Inventor: Thomas Bogun, Glinde (DE)

(*) Notice: Subject to any disclaimer, the term of this patent is extended or adjusted under 35 U.S.C. 154(b) by 0 days.

(21) Appl. No.: 16/460,862

(22) Filed: Jul. 2, 2019

(65) Prior Publication Data
US 2020/0009601 A1    Jan. 9, 2020

(30) Foreign Application Priority Data
Jul. 5, 2018 (EP) .................................. 18181910

(51) Int. Cl.
| | | |
|---|---|---|
| B05D 3/00 | (2006.01) | |
| B05D 1/18 | (2006.01) | |
| B05D 3/02 | (2006.01) | |
| B05C 3/172 | (2006.01) | |

(52) U.S. Cl.
CPC ............. *B05C 3/172* (2013.01); *B05D 1/18* (2013.01); *B05D 3/007* (2013.01); *B05D 3/0218* (2013.01)

(58) Field of Classification Search
CPC ......... B05D 1/18; B05D 3/007; B05D 3/0218
See application file for complete search history.

(56) References Cited

U.S. PATENT DOCUMENTS

| | | |
|---|---|---|
| 1,582,434 A | 4/1926 | Simons |
| 3,145,832 A | 8/1964 | Case |
| 4,168,194 A * | 9/1979 | Stiles .................... B29C 70/528 264/137 |

(Continued)

FOREIGN PATENT DOCUMENTS

| | | |
|---|---|---|
| DE | 26 38 763 A1 | 1/1978 |
| DE | 2753901 A1 | 6/1979 |

(Continued)

OTHER PUBLICATIONS

Merriam Webster. Permanent. Merriam Webster, https://www.merriam-webster.com/dictionary/permanent. (Year: 2020).*

(Continued)

*Primary Examiner* — Dah-Wei D. Yuan
*Assistant Examiner* — Kristen A Dagenais-Englehart
(74) *Attorney, Agent, or Firm* — Christensen O'Connor Johnson Kindness PLLC

(57) ABSTRACT

Subject matter of the present invention is a method of applying coating layers (9) to a substrate (1, 11, 21, 31), wherein the substrate (1, 11, 21, 31) is drawn through a coating chamber (2) containing a pressurized coating agent (3) being liquefied or softened by means of a thermal exposure, wherein the substrate (1, 11, 21, 31) is drawn through a drawing tool (8), wherein the coating agent (3) serves as a lubricant between the drawing tool (8) and a surface of the substrate (8) and wherein at the same time the coating layer (9) is applied to the surface of the substrate (8). Subject matter of the invention is also a corresponding apparatus for applying a coating layer (9) to a substrate (1, 11, 21, 31). By means of the invention coating layers can be applied to a substrate in an efficient and economical way.

15 Claims, 5 Drawing Sheets

(56) References Cited

U.S. PATENT DOCUMENTS

Figure 1:
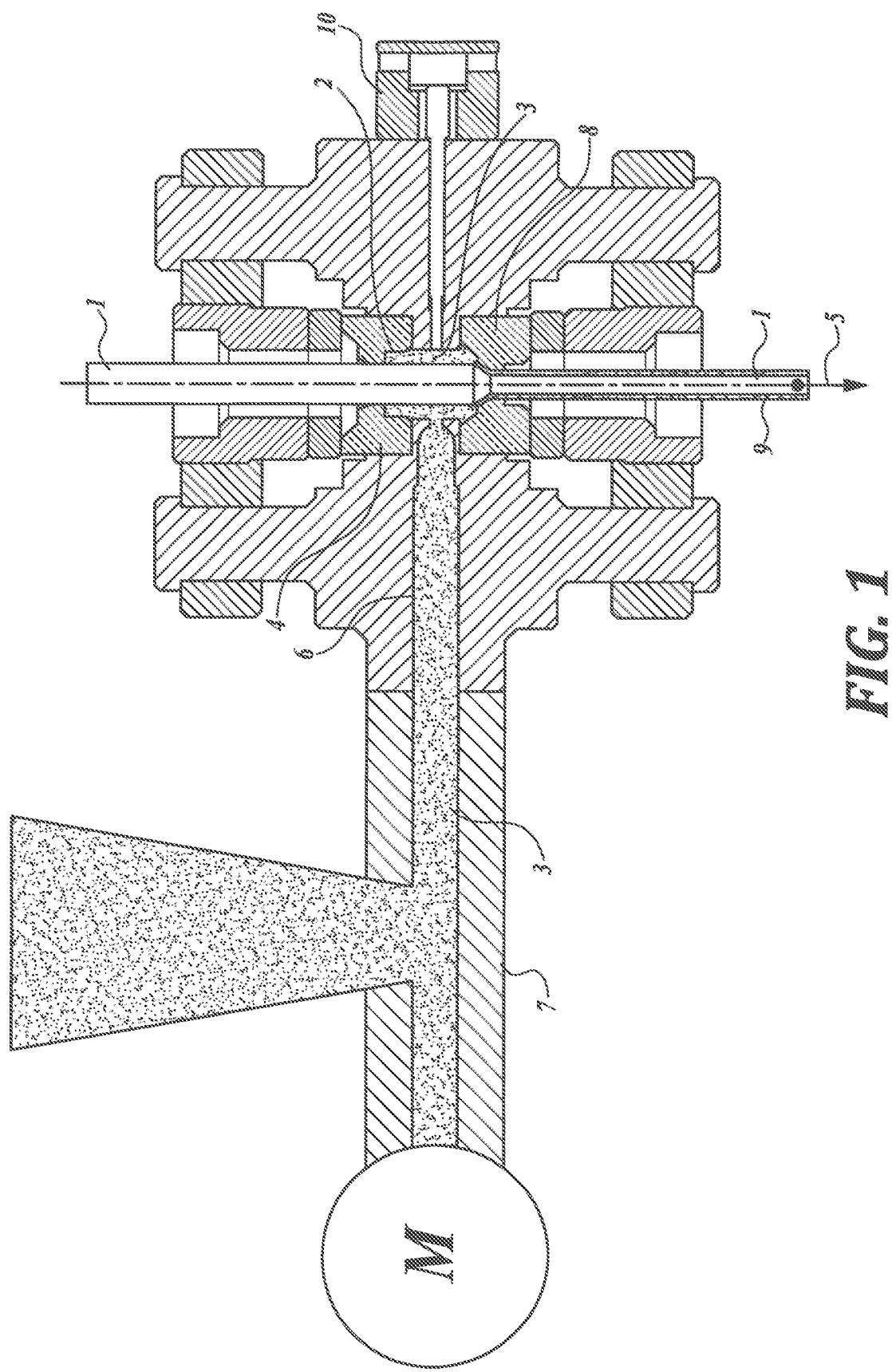

| | | | | |
|---|---|---|---|---|
| 4,270,373 A * | 6/1981 | Hirato | ............... | B21C 3/02 |
| | | | | 72/47 |
| 4,573,336 A * | 3/1986 | Hagglund | ............... | B21C 1/12 |
| | | | | 374/165 |
| 5,451,355 A * | 9/1995 | Boissonnat | ............... | B29C 48/06 |
| | | | | 264/172.16 |
| 5,972,503 A * | 10/1999 | Woodside | ............... | B29B 15/12 |
| | | | | 428/394 |
| 2002/0158357 A1 * | 10/2002 | Swanson | ............... | B29C 48/34 |
| | | | | 264/40.6 |
| 2007/0095434 A1 * | 5/2007 | Zelim | ............... | C23C 8/00 |
| | | | | 148/226 |
| 2011/0100081 A1 * | 5/2011 | Rau | ............... | C10M 173/02 |
| | | | | 427/419.7 |

FOREIGN PATENT DOCUMENTS

| | | |
|---|---|---|
| DE | 198 17 088 A1 | 10/1999 |
| DE | 199 23 035 A1 | 11/2000 |
| EP | 0 013 012 A1 | 7/1980 |
| EP | 0 030 071 A1 | 6/1981 |
| GB | 1584643 | 2/1981 |
| GB | 2530113 A | 3/2016 |
| WO | 02/072291 A1 | 9/2002 |
| WO | 2013/020977 A1 | 2/2013 |

OTHER PUBLICATIONS

Ajex & Turner, "Trapezoidal Shaped Wire Drawing Die & Sector Shaped Compacting Die (D Shape Sector Die)," International Wire & Machinery Association (IWMA), News for Members, <http://www.iwma.org/Member-News/ajex-turner-trapezoidal-shaped-wire-drawing-die-sector-shaped-compacting-die-d-shape-sector-die> [retrieved Jan. 24, 2019], Mar. 2017, 3 pages.

European Search Report dated Dec. 21, 2018, issued in corresponding European Application No. 18181910.3, filed Jul. 5, 2018, 18 pages.

Communication dated Dec. 3, 2021, issued in corresponding European Application No. EP18 181 910, filed Jul. 5, 2018, 6 pages.

* cited by examiner

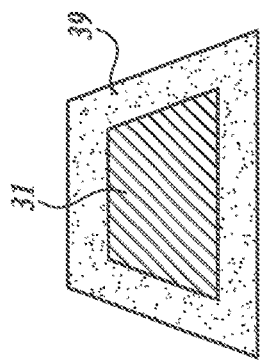
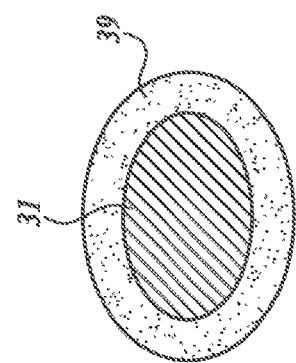
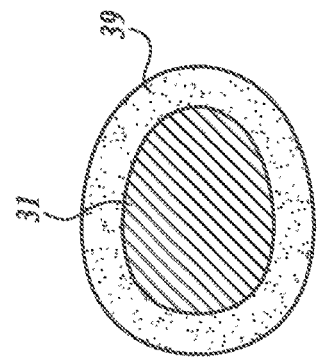
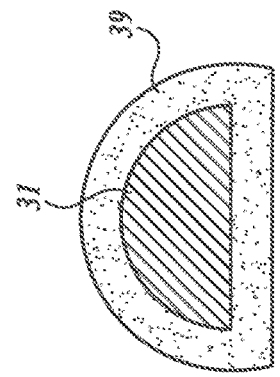
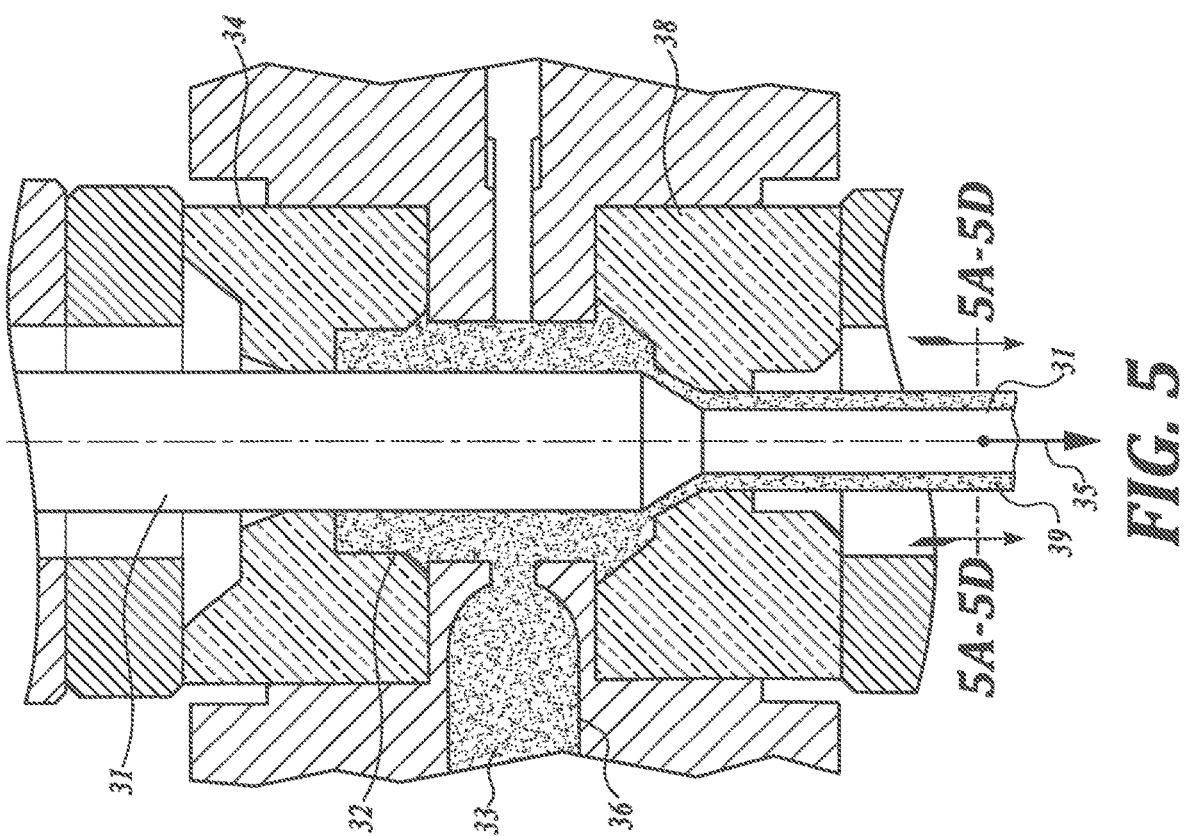

METHOD AND DEVICE FOR APPLYING COATING LAYERS TO A COATING MATERIAL

The invention relates to a method and an apparatus for applying coating layers to a coating substrate such as, for example, a wire, particularly a metallic wire, such as aluminum wire, cooper wire, or wires made from different metals or alloys. Aluminum wires being coated according to the inventive method can be used, for instance, for fabricating closure clips for bags and tubes in food production. Copper wires being coated according to the inventive method can be used, for instance, in the fields of electrical engineering and electronics.

For applying coating layers on wire substrates it is known to use wire coating apparatuses in which organic resin being dissolved in a solvent is applied on the wire by means of a continuous process or immersion process. The solvents used are usually hydrocarbons or aqueous systems which have an adverse effect on health protection and economic efficiency of the processes when they escape or evaporate from the lacquer layer (DE-AS 26 38 763, WO 2013/020977 A1). After application the wire is usually pulled through a lacquer stripping nozzle which strips excess lacquer (DE 199 23 035 A1). Since the inner diameter of the stripping nozzle is larger than the diameter of the uncoated wire, the stripping nozzle with its hole forms a gauge for the thickness of the coating layer.

Also known is the use of thermoplastic materials for the coating layer (EP 0 030 71 B1, WO 2013/020977). Here, the thermoplastic materials are applied in melted form on the wire by means of an extruder. Also in this type of process wiping nozzles may be used which form with their hole a gauge for the thickness of the coating layer (DE-OS 27 53 91). After applying the coating layer, an after-treatment may follow, for example, a cooling or radiation treatment for post-crosslinking of the thermoplastic material.

A disadvantage of the known processes carried out with stripping nozzles is that the coating layers have an insufficient quality with regard to a uniform layer thickness. The reason is that the wire to which the coating layer adheres may be laterally deflected during its transport through the lacquer stripping nozzle, resulting in radially and axially varying layer thicknesses as well as layer defects.

The object of the invention is to develop a method and apparatus for applying coating layers to a substrate, which are feasible without harmful lacquer solvents and which allow to achieve a high-performance lacquer coating with a simultaneously improved coating quality and a high increase in productivity.

This object is achieved by means of a method for applying coating layers to a substrate, in which the substrate to be coated is drawn through a coating chamber containing a pressurized coating agent liquefied or softened by thermal exposure, wherein the substrate is drawn though a drawing tool, wherein the coating agent serves as a lubricant between the drawing tool and a surface of the substrate and wherein simultaneously the coating layer is applied to the surface. The drawing tool may be arranged at the outlet of the coating chamber.

In a preferred embodiment the substrate comprises a wire or may be wire-shaped. Alternatively, the substrate may comprise a tube or may be tube-shaped.

Preferably, a cross-sectional shape of the substrate is changed while the substrate is drawn through the drawing tool. In particular, a cross section of the substrate may be reduced.

In a preferred embodiment, a degree of deformation is realized with the drawing tool in the range between 0.01% and 30%, preferably between 0.05% and 15%, more preferably between 0.1% and 5%. The latter range is particularly suitable for coating aluminum wire to be used for closure clips.

According to the invention, solvent free or low-solvent coating agents are advantageously used, preferably polymers, such as polyethylene waxes or polyurethanes.

Expediently, the coating agent may be supplied to the coating chamber by means of an extruder.

In a preferred embodiment, a thermal exposure is carried out on the coating agent and/or on the substrate.

Preferably, a pre-heated substrate is supplied to the coating chamber. The substrate may be pre-heated in a conventional manner.

The substrate provided with the coating layer is expediently cooled after leaving the coating chamber. The coating layer may be brought into contact with a cooling medium in a conventional manner, for example, by using water as a cooling medium.

In a preferred embodiment the pressure prevailing in the coating chamber and/or the prevailing temperature are measured. The measurement values of the pressure and/or temperature measurement are further preferably used for controlling and regulating the coating process and its stability.

For achieving the inventive object the invention also encompasses an apparatus for applying coating layers to a substrate, comprising a coating chamber through which the substrate to be coated can be drawn, wherein the coating chamber contains a pressurized coating agent being liquefied or softened by a thermal exposure, wherein the coating chamber further comprises a drawing tool through which the substrate can be drawn. In a preferred embodiment the coating chamber comprises at a wire inlet side a sealing tool being preferably annular-shaped and enclosing the entering wire for purposefully avoiding leakage of the coating agent against a direction of transport. Advantageously, the drawing tool is arranged at the wire outlet side.

The drawing tool is preferably configured for reducing a cross-section of the substrate, while the substrate is drawn through the drawing tool (8). The drawing tool may be a drawing die being commonly used in the drawing technology and being commercially available. Such drawing dies for wire drawing are commercially available and are commercially produced and traded worldwide, for instance by Willi Bremer GmbH, D-35756 Mittenaar. A special design of the drawing die used is not required for the invention. Examples of such drawing dies are disclosed in U.S. Pat. Nos. 1,582,434 and 4,270,373 or in WO 02/072291 A1. The drawing tool may be designed for reducing a cross-section of the substrate with a degree of deformation preferably in the range between 0.01% and 30%, preferably between 0.05% and 15%, further preferably between 0.1% and 5%.

Expediently, an extruder may be connected to the coating chamber for supplying the coating agent and for producing the pressure.

In a preferred embodiment, the drawing tool is configured to change a cross-sectional shape of the substrate, when the substrate is drawn through the drawing tool.

Expediently, the coating chamber is heated.

Preferably, a pressure gauge and/or a temperature measurement device are connected to the coating chamber, wherein, preferably, the measurement values are used for controlling and regulating the coating process and its stability.

Advantageously, the coating chamber contains a solvent-free or a low-solvent coating agent.

According to the invention, the coating agent are preferably polymers, such as polyethylene or polyurethane, being softened or liquefied by thermal exposure.

With the solution according to the invention, a more economical application of coating layers particularly on metallic wires is made possible in comparison with the prior art. By using the tool suitable for reducing the cross-section—which preferably causes a cross-section reduction with a degree of deformation in the range between 0.1% and 5%—instead of a stripping nozzle, the coating layers produced have an excellent quality with regard to a uniformly thick and closed coating layer over the circumference and strand length of the wire and are adhering to the wire surface particularly firmly.

A further advantage is that hydrocarbonaceous coating agents are avoided and, thus, no harmful solvent vapors arise which have a negative effect on health protection and economic efficiency of the processes when they escaping and evaporating from the coating layer. In addition, the solution according to the invention makes it possible to achieve a high speed increase when applying coating agents on wires.

In the case of copper wire for electrotechnical applications, the coating layer achieves particularly good insulation properties, since the metallic flake particles occurring on the bare copper wire are embedded in the coating layer by the deformation process occurring in the coating process according to the invention and, thus, cannot act as disruptive conductor bridges in the coating layer serving as an insulator.

When using the present invention for coating a wire, the shape of the wire substrate leaving the drawing tool or the drawing die need not be round. Rather, the cross-sectional shape of the coated wire may be square or rectangular. Wires of this shape can be conveniently formed into a continuous clip shape, thereby to form closure clips for bags and tubes in food production. This eliminates the need for having to form the coated round wire into a square or rectangular cross-sectional shape as needed for manufacturing the closure clips.

As a further embodiment, the initially round wire substrate can be formed into a coated wire of other cross-sectional shapes, such as rectilinear, trapezoidal, oval, elliptical, oblong or otherwise "out of round" cross section. Wire drawn into these cross-sectional shapes can be fed into a press which cuts a length of such wire and forms the wire into U-shaped clips. The rectilinear, trapezoidal, oval, elliptical, oblong or otherwise "out of round" cross-sectional shapes enable the formed U-shaped clips to have a rounded exterior surface whereas the surface with the "U" is flat or planar. In practice, this enables the clip to securely close the bag or tube.

Further, the present invention can be utilized in conjunction with substrates other than wire. For example, the present invention can be applied to substrates in the form of tubing used to transport fluids. When the tubing is drawn through a drawing tool, a coating is applied to its exterior surface as the outside diameter of the tubing is slightly or nominally reduced in diameter. A mandrel may be positioned within the tubing at the location of the die so as to achieve a desired reduction in the wall thickness of the tubing. As in the application of coating to a wire substrate, the liquefied coating agent acts as a lubricant during the drawing of the tubing through the draw die.

The invention is explained below with reference to exemplary embodiments and accompanying drawings.

Figure 2:
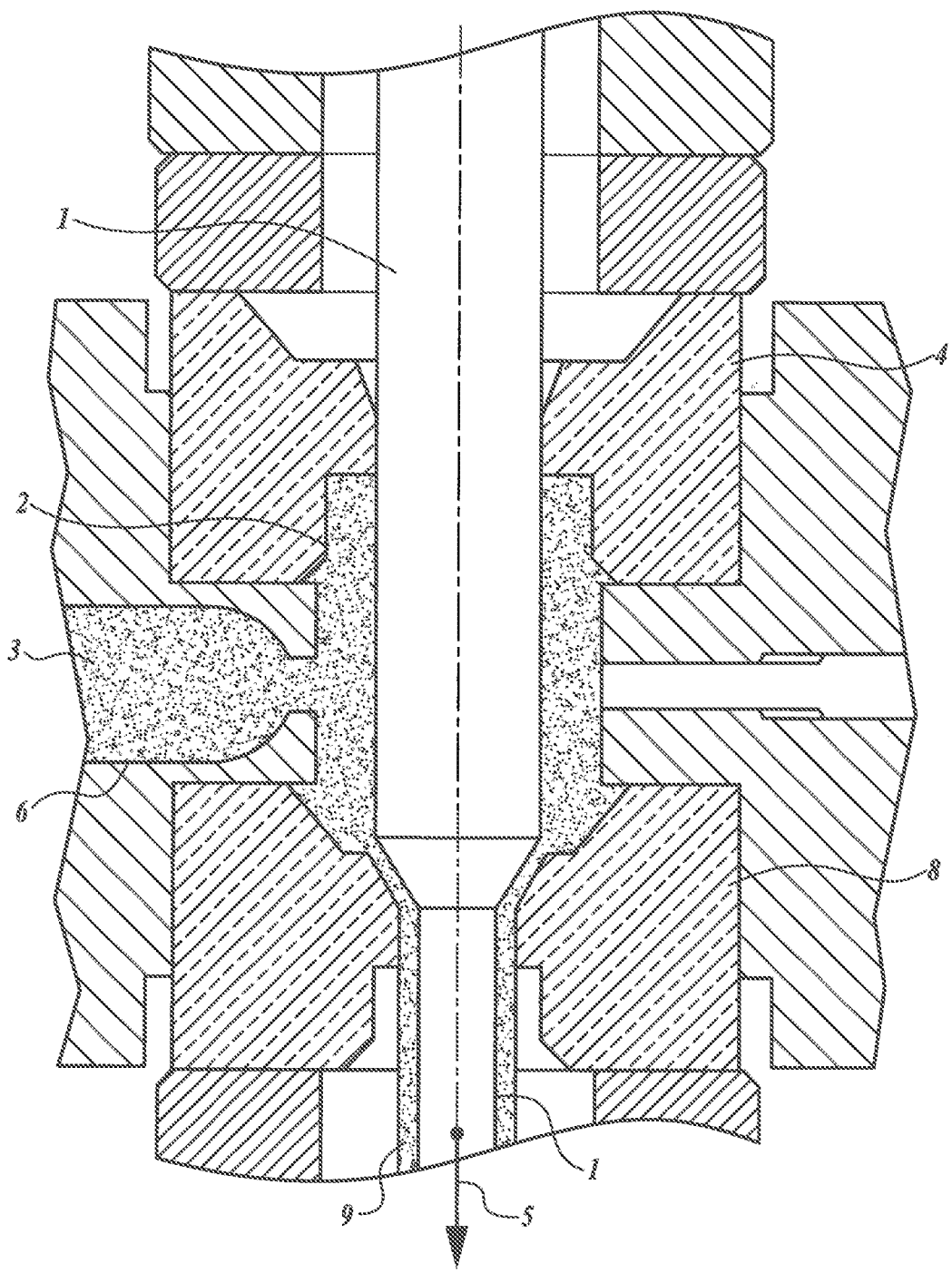
Figure 3:
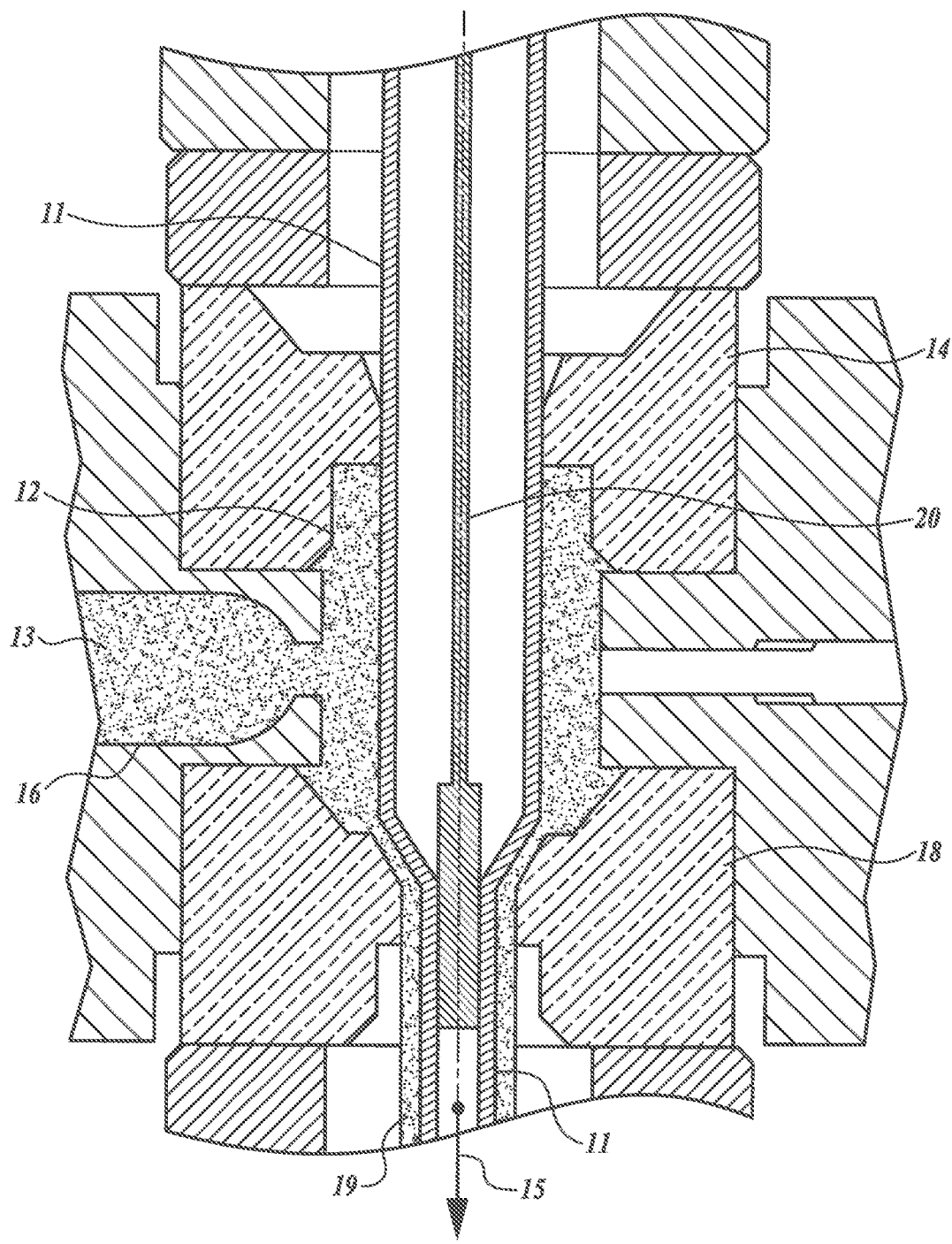
Figure 4A:
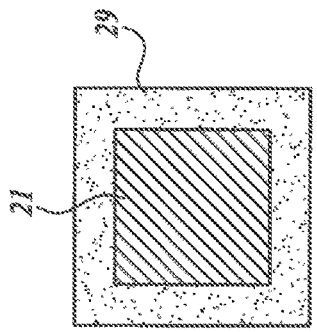
Figure 4B:
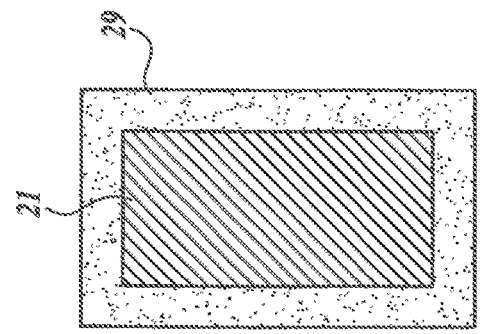
Figure 4:
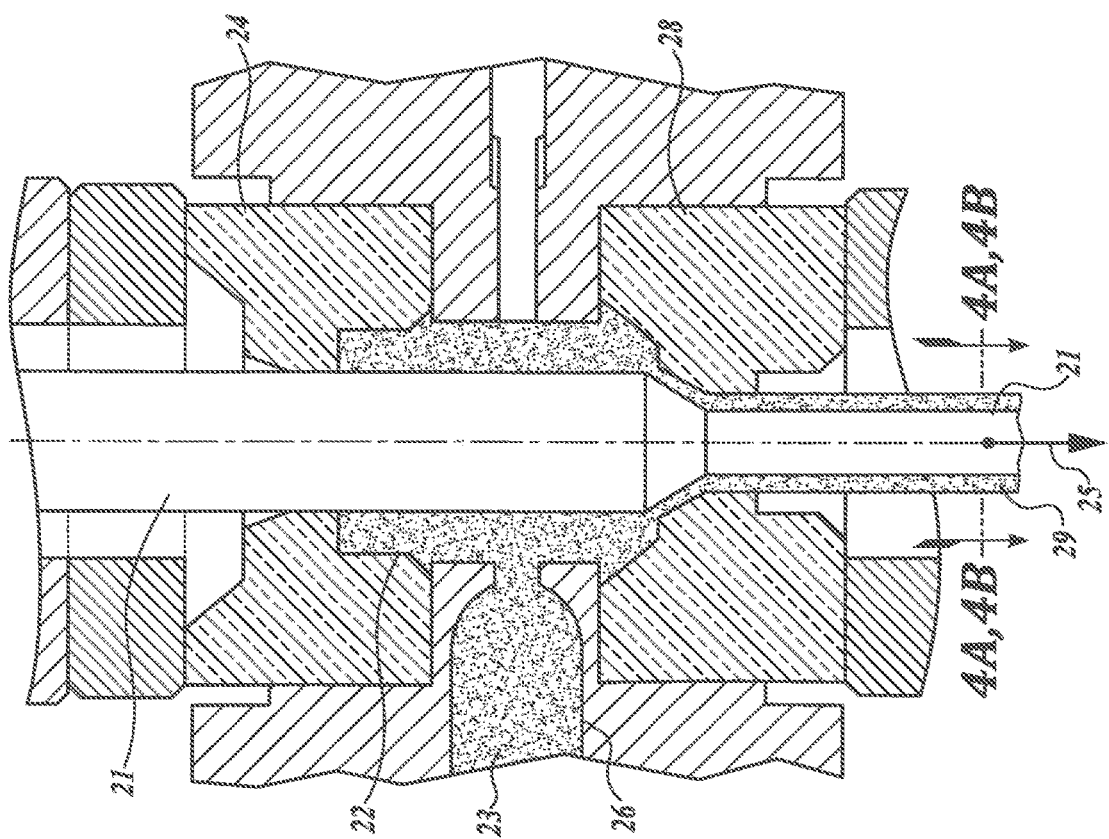

The drawings show:

FIG. 1 an apparatus for applying a coating layer on wire in a sectional view, FIG. 2 a sectional view of the coating chamber of FIG. 1 as a detail and in a larger scale, FIG. 3 a view similar to FIG. 2, showing the present invention as applied to tubing, FIG. 4 a view similar to FIG. 2, showing the application of the present invention for transforming round wire into wire of square or rectangular cross section, FIG. 4A, 4B cross-sectional views of FIG. 4, showing the cross-sectional shapes into which the substrate is drawn or reshaped, FIG. 5 a view similar to FIG. 2, wherein the initial round cross-sectional wire is transformed into wire of rectilinear, trapezoidal, elliptical, oval, oblong or "out of round" cross section, FIG. 5A-5D cross-sectional views of FIG. 5, showing the cross-sectional shapes into which the substrate is drawn or reshaped.

EXAMPLE 1

This example relates to applying a coating layer of a modified polyethylene wax to a wire 1 by means of the apparatus shown in the drawings.

The wire 1 in this case is an aluminum wire from which, for example, closure clips for bags and tubes for food production can be produced after lacquering.

The apparatus includes a coating chamber 2 containing the liquefied polyethylene wax 3 as a coating agent. The wire 1 to be coated is pulled through the coating chamber 2. At the inlet of the coating chamber 2 an annular sealing tool 4 encloses the wire 1 and prevents leakage of the coating agent 3 against the transport direction 5 of the wire 1.

The liquefied polyethylene wax 3 is pressed via a feed 6 into the coating chamber 2 by means of an extruder 7 at a temperature between 88° C. and 90° C. In the coating chamber, a pressure of 1.0 MPa is generated.

The wire 1 is pulled through the apparatus at a speed of 4 m/s.

At the outlet of the coating chamber 2, a forming tool is arranged in the form of a drawing die 8 commonly used in wire drawing technology. By means of the drawing die 8 the wire 1 having an initial diameter of 2.4 mm is deformed with a degree of deformation of 2.4%.

During the deforming process carried out by the die 8, the liquefied polyethylene wax 3 serves as a lubricant and at the same time during the deforming it is impressed as a closed and adherent coating layer on the wire 1 having a reduced diameter. The produced coating layer 9 has a thickness of 4.8 μm.

The coating chamber 2 communicates with a pressure and a temperature measuring device 10, with which the pressure and the temperature in the coating chamber 2 are monitored. Based on the measured values, the coating process can be controlled and regulated by means of a pressure and temperature control and thus kept stable.

After leaving the coating chamber 2, the wire 1 provided with the coating layer 9 is cooled with water, then dried and then wound up.

EXAMPLE 2

This example relates to the application of a coating layer of a modified polyethylene wax onto an aluminum wire 1 having a starting diameter of 3.6 mm.

For the application of the coating layer, the apparatus shown in the drawings comprising liquefied polyethylene wax 3 contained in the coating chamber 2 is used, the polyethylene wax 3 having a temperature between 86° C. and 88° C. The pressure of the coating agent 3 produced by the extruder 7 in the coating chamber 2 is 1.0 MPa.

The wire 1 is pulled through the apparatus at a speed of 3 m/s.

At the outlet of the coating chamber 2, a forming die 8 which is customary in wire drawing technology is arranged as forming tool, with which the wire 1 is formed with a degree of deformation of 3.5%. The coating layer 9 formed on the deformed wire 1 has a thickness of 5.2 μm.

After leaving the coating chamber 1, the wire 1 provided with the coating layer 9 is cooled with water, then dried and then wound up.

EXAMPLE 3

This example relates to applying a coating layer of a modified polyethylene wax to a substrate in the form of tubing 11 by means of the apparatus shown in FIG. 3, which is similar to FIGS. 1 and 2.

The tubing 11 in this case is of aluminum and can be used to transport fluids such as pressurized air or other gasses or liquids, such as hydraulic fluid.

The apparatus includes a coating chamber 12 containing the liquefied polyethylene wax 13 as a coating agent. Through the coating chamber 12 a tubing 11 to be coated is pulled. The tubing 11 encloses at the entrance of the coating chamber 12, an annular sealing tool 14 which helps prevent the exit of the coating agent 13 against the transport direction 5 of the tubing 11.

Via a feed 16, the polyethylene wax 13 liquefied therein is pressed into the coating chamber 12 by means of an extruder 17 at a temperature between 88° C. and 90° C.

In the coating chamber, a pressure of 1.0 to 20 MPa is generated.

The tubing is pulled through the device at a speed of 4 m/s.

At the outlet of the coating chamber 12, a forming tool is arranged in the form of a drawing tool 18 commonly used in tube drawing technology. A mandrel 20 is positioned within the tubing 11 at the drawing tool 18 so as to achieve a desired wall thickness for the tubing 11. The initial diameter of the tubing can be 12 mm with 1.0 mm wall thickness. Both the diameter and the wall thickness can be reduced by about 5%.

When forming by the drawing tool 18, the liquefied polyethylene wax 13 serves as a lubricant, and it is at the same time impressed on the reduced in diameter tubing 11 during the forming as a closed and adherent coating layer. The produced coating layer 9 has a thickness of 5-10 μm.

The coating chamber 12 communicates with a pressure and a temperature measuring device 10, with which the pressure and the temperature in the coating chamber 12 are monitored. Based on the measured values, the coating process can be controlled and regulated by means of a pressure and temperature control and thus kept stable.

EXAMPLE 4

This example relates to the application of a coating layer of a modified polyethylene wax onto a substrate in the form of an aluminum wire 21 having a starting diameter of 3.6 mm.

For the application of the coating layer, the apparatus shown in FIG. 4 comprising liquefied polyethylene wax 23 contained in the coating chamber 22 is used, the polyethylene wax 23 having a temperature between 86° C. and 88° C. The pressure of the coating agent 23 produced by the extruder 27 in the coating chamber 22 is 1.0 MPa.

The wire 21 is pulled through the device at a speed of 3-4 m/s.

At the exit of the coating chamber 22, a forming tool 28 is arranged, with which the wire 21 is formed. The overall cross-sectional area of the original round wire can be reduced by a desired percentage (e.g., 3 to 5%) when formed into a square or rectangular shape. The reduction of cross-section, however, is not inevitably required, since during changing the exterior cross-sectional shape from round to square/rectangular sufficient pressure is applied to the exterior surface of the drawn material to apply the coating material to the exterior of the wire. The coating layer 29 formed on the deformed square/rectangular shaped wire 21 has a thickness of 5-10 μm.

After leaving the coating chamber 22, the wire 21 provided with the coating layer 29 is cooled with water then dried and then pressed into a continuous clip shape by conventional forming techniques. An advantage of the above process is that it is not required to form the round coated wire into a square/rectangular cross-section shape before pressing into a continuous press shape.

EXAMPLE 5

This example relates to the application of a coating layer of a modified polyethylene wax onto a substrate in the form of an aluminum wire 31 having a starting diameter of 3.6 mm.

For the application of the coating layer, the apparatus shown in FIG. 5 with the liquefied polyethylene wax 3 contained in the coating chamber 32 is used, the polyethylene wax having a temperature between 86° C. and 88° C. The pressure of the coating agent 33 produced by the extruder 37 in the coating chamber 32 is 20-30 MPa.

The wire 31 is pulled through the device at a speed of 3-4 m/s.

At the exit of the coating chamber 32, a forming tool 38 is arranged, with which the wire 31 is formed into a rectilinear, trapezoidal, elliptical, oval, oblong or otherwise "out of round" cross-sectional shape. The overall cross-sectional area of the original round wire can be reduced by a desired percentage when formed into the rectilinear, trapezoidal, elliptical, oval, oblong or "out of round" shape. However, the reduction in cross section is not inevitably required, since during changing the exterior cross-sectional shape from round to rectilinear, trapezoidal, elliptical, oval oblong, or "out of round" shape sufficient pressure is applied to the exterior surface of the drawn material to apply the coating material to the exterior of the reshaped wire. If the cross-sectional area is reduced in size, such reduction can be, for example, from about 3 to 5%. The coating layer 39 formed on the deformed wire 31 has a thickness of 5-10 μm.

After leaving the coating chamber 32, the wire 31, provided with the coating layer 39, is cooled with water, then dried and then the coated and reformed wire is cut and then pressed into a U-shaped clip. An advantage of the above process is that the exterior surfaces of the clip are rounded, whereas the interior surface of the formed clip will be substantially flat or planar, thereby to provide a secure grip when the clip is used to close off a tubular, gathered container end.

LIST OF USED REFERENCE SIGNS AND TERMS 1, 11, 21, 31 wire
2, 12, 22, 23 coating chamber
3, 13, 23, 33 polyethylene wax/coating agent
4, 14, 24, 44 sealing tool
5, 15, 25, 35 direction of transport
6, 16, 26, 36 feed
7 extruder
8, 18, 28, 38 Cross-section reduction tool/drawing die
9, 19, 29, 39 coating layer
10 pressure gauge and temperature measuring device

The invention claimed is:

1. A method of applying coating layers to a metallic wire substrate or a metallic tube substrate, comprising:
    liquefying or softening a polymer coating agent being by thermal exposure;
    supplying the liquefied or softened polymer coating agent under pressure to a coating chamber of a coating apparatus;
    drawing a single length of a metallic wire substrate or a metallic tube substrate through the coating chamber containing the pressurized polymer coating agent;
    drawing the substrate through a drawing tool located at the outlet of the coating chamber to reduce the cross-sectional area of the single length of the metallic wire substrate or the metallic tube substrate as the single length of the metallic wire substrate or the metallic tube substrate is drawn through the drawing tool;
    lubricating the interface between the drawing tool and the surface of the single length of the metallic wire substrate or surface of the metallic tube substrate with the coating agent from the coating chamber as the single length of the metallic wire substrate or the metallic tube substrate is drawn through the drawing tool,
    a layer polymer coating agent remaining on the surface of the single length of the metallic wire substrate or the metallic tube substrate after the single length of the metallic wire substrate or the metallic tube substrate is reduced in cross-sectional area from being drawn through the drawing tool.

2. The method according to claim 1, wherein the metallic substrate comprises a length of a round wire, or a length of a round tube.

3. The method according to claim 1, wherein a cross-sectional shape of the single length of the metallic wire substrate or the metallic tube substrate is reduced as the single length of the metallic wire substrate or the metallic tube substrate is drawn through the drawing tool.

4. The method according to claim 1, wherein a degree of reduction from the original cross-sectional area of the single length of the metallic wire substrate is realized with the drawing tool in the range of 0.01% to 30.

5. The method according to claim 1, wherein a solvent-free or low-solvent coating agent is used.

6. The method according to claim 1, comprising performing a thermal exposure on the coating agent and/or the single length of the metallic wire substrate or the metallic tube substrate.

7. The method according to claim 1, comprising supplying a preheated single length of the metallic wire substrate or the metallic tube substrate to the coating chamber.

8. The method according to claim 1, comprising cooling the single length of the metallic wire substrate or the metallic tube substrate provided with the coating layer after leaving the coating chamber.

9. The method according to claim 1, further comprising:
    measuring the pressure prevailing in the coating chamber and/or the prevailing temperature in the coating chamber; and
    using the measured values to control and regulate the coating process and its stability.

10. The method of claim 1, wherein the polymer is a polyethylene wax or polyurethane.

11. The method according to claim 1, wherein a degree of deformation from the original cross-sectional shape of the single length of the metallic wire substrate is realized with the drawing tool in the range of 0.05% to 15%.

12. The method according to claim 1, wherein a degree of deformation from the original cross-sectional shape of the single length of the metallic wire substrate is realized with the drawing tool in the range of 0.1% to 5%.

13. The method according to claim 1, comprising changing the cross-sectional shape of the single length of the metallic wire substrate or the metallic tube substrate to define a rounded exterior portion and a flat exterior portion.

14. The method according to claim 1, comprising pressurizing the coating agent by an extruder in flow communication with the coating chamber.

15. The method according to claim 1, further comprising incorporating the drawing tool into the coating chamber.

* * * * *